United States Patent

[11] 3,545,551

| [72] | Inventor | Roelf Niemeyer |
| | | P.O. Box 21, Vancouver Island, British Columbia, Canada |
| [21] | Appl. No. | 700,951 |
| [22] | Filed | Jan. 26, 1968 |
| [45] | Patented | Dec. 8, 1970 |
| [32] | Priority | Nov. 9, 1967 |
| [33] | | Canada |
| [31] | | No. 004,658 |

[54] INTERCHANGEABLE BLADE HOE KIT
1 Claim, 6 Drawing Figs.

[52] U.S. Cl. .................................................. 172/371,
172/765; 306/1.6
[51] Int. Cl. .................................................. A01b 1/22
[50] Field of Search.......................................... 172/371,
13, 765, 721; 37/40, 53, 16, 137; 306/1.5, 1.6; 30/346, 353, 356; 287/125, 128; 16/114

[56] References Cited
UNITED STATES PATENTS

| 384,504 | 6/1888 | Braman .................. | 287/125 |
| 1,954,854 | 4/1934 | Vonderahe .................. | 172/371 |
| 2,969,120 | 1/1961 | Randolph .................. | 172/371 |

FOREIGN PATENTS

| 10,411 | 7/1890 | Great Britain .............. | 172/371 |
| 163,788 | 11/1933 | Switzerland .................. | 172/371 |

*Primary Examiner*—Robert E. Pulfrey
*Assistant Examiner*—Ronald C. Harrington
*Attorney*—Ralph Burch

ABSTRACT: An interchangeable blade hoe kit is herein provided. It includes a handle which is provided with means for detachably securing interchangeable blades thereto. The hoe blade of the kit is triangular in plan and, in elevation, is secured to the handle at an obtuse angle to the handle. The lawn edger blade is elliptical in elevation and, in elevation, is secured to the handle at an acute angle to the handle. By these means, both hoeing, weeding and lawn edging may be accomplished by engagement of the blade with the ground to be acted on and applying a simple push-pull action to the handle.

PATENTED DEC 8 1970 3,545,551
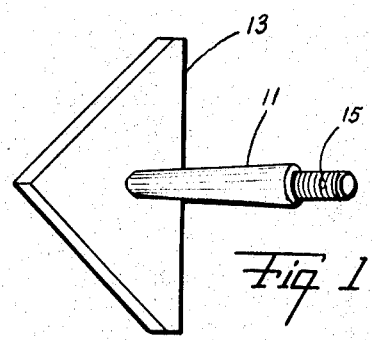
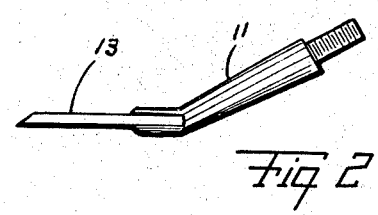
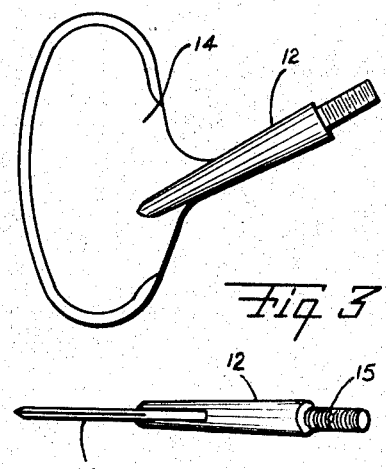
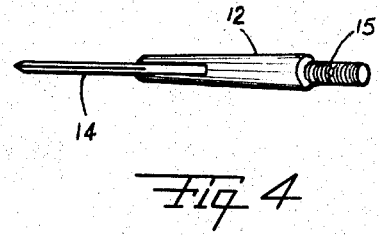
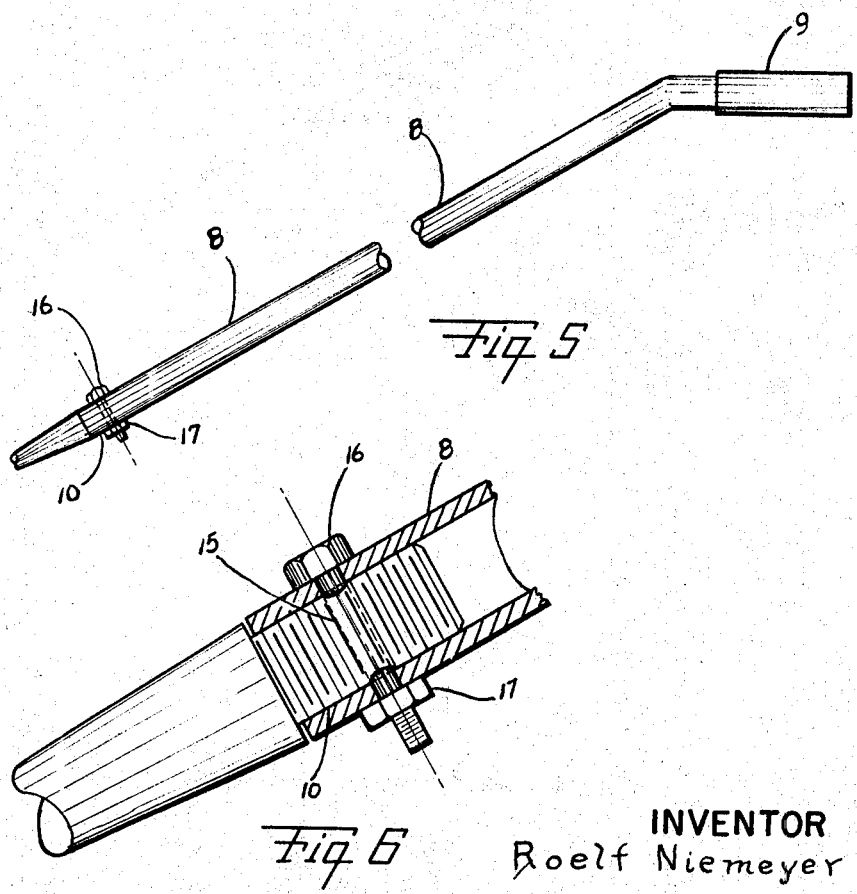
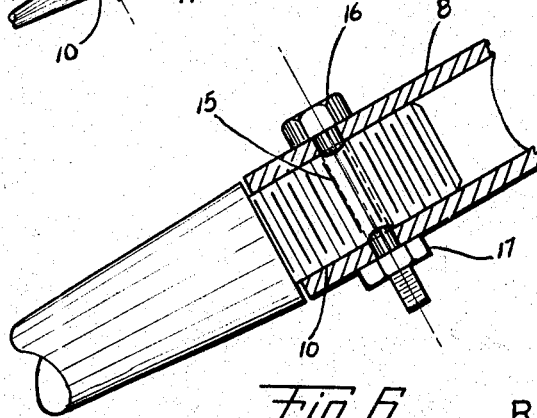
INVENTOR
Roelf Niemeyer
By
Ralph Burch
ATTORNEY

INTERCHANGEABLE BLADE HOE KIT

This invention relates to a manually operable tool in the form of a kit, the handle of which, may fastened to one of two interchangeable blades of different shape and used for weeding, cultivating and edging.

It is common practice when weeding and, or cultivating to use a hoe, which is a long handled implement having a straight edge blade fastened perpendicularly to this long handle. This implement performs a chopping action upon the ground for the purpose of breaking loosening and digging out weeds. This chopping and digging process is activated by the operator with his extended arm and offers very poor leverage. The straight cutting edge of this implement is very inefficient for cutting into the ground and further makes hoeing a very exhaustive task.

It is the main object of this invention to provide a garden hoe kit that is efficient, simple to construct, economically manufactured, durable and reliable in operation.

It is an object of a further aspect of this invention to provide a hoe blade for such a kit, which blade may be detachably secured to the handle so that the action of the operator will be an easy push and pull action that will serve to rake the ground rather than chop it.

It is an object of yet another aspect of this invention to provide a lawn edger blade for such a hoe kit, which blade may be detachably secured to the hoe handle, the implements requiring but an easy push and pull action and its blade has the effect of shearing into the ground. By a broad aspect of this invention, a multibladed hoe and lawn edger kit is provided. The hoe kit includes a handle, the handle including a major portion, a grip portion at one end of the major portion, the grip portion being disposed at an obtuse angle to the major portion, a terminal portion at the other end of the major portion of the terminal portion being an internally threaded, hollow, cylindrical member, and an aperture formed through the terminal portion. A hoe blade is provided, the hoe blade including a main blade portion in the handle extension portion which is adapted to be detachably secured to the handle. The hoe blade includes a blade portion which, in plan view, is substantially triangular in shape, and has sharpened edges. The handle extension part of the hoe blade includes an externally threaded, terminal, cylindrical portion which is adapted to mate with the terminal portion of the handle, and it includes an aperture therethrough which is adapted to register with the aperture of the handle. The extension and the hoe blade, in elevation, are disposed at an obtuse angle to one another. The lawn edger blade includes a main blade portion an a handle extension portion which is adapted to be detachably secured to the handle portion. The blade has a main blade portion which, in elevation, is substantially elliptical in shape having sharpened edges. The handle extension portion includes an externally threaded, terminal, cylindrical portion which is adapted to mate with the terminal portion of the handle and it includes an aperture therethrough which is adapted to register with the aperture in the handle. The extension and the lawn edger blade are, in elevation, disposed at an acute angle to one another. The entire kit also includes a bolt and nut combination which is adapted, when the hoeing blade or the lawn edger blade is slidably secured to the handle, to pass through the registering apertures in order to provide a more positive securement of the selected blade to the handle. A simple push-pull operation of the grip portion of the handle facilitates the hoeing and weeding operation with the hoeing blade or the lawn edging operation with the lawn edging blade.

In the accompanying drawings,

FIG. 1, is a plan elevation of a triangular hoe blade forming a component of the kit of an aspect of this invention;

FIG. 2, is a side elevation of the hoe blade of FIG. 1;

FIG. 3, is a side elevation of a lawn edger forming a component of the kit of an aspect of this invention;

FIG. 4, is a plan elevation of the lawn edger of FIG. 3;

FIG. 5, is a side elevation of the handle forming a component of the kit of an aspect of this invention;

FIG. 6 is an enlarged sectional side elevation of the attachment of the handle to a selected one of the blades of FIGS. 1 and 2 or FIGS. 3 and 4.

Referring to the drawings, particularly to FIGS. 1 to 6 inclusive, the garden hoe kit consist of a handle 8 which is constructed of a light metal or alloy. The upper end of this handle should be bent slightly to provide a grip portion disposed at an obtuse angle to the major portion and covered with a resilient grip 9, for better leverage and grip. The lower end of this handle 10 provides a hollow, cylindrical terminal portion which is threaded internally so as to screw on to the extensions 11 and 12 of the blades 13 and 14. A hole 15 should be drilled angularly through both the handle 8, and the extensions 11 and 12 where they screw together to provide registering apertures for the insertion of a bolt 16, which, in turn, is engaged by nut 17.

The cutting blade 13 substantially takes the form of a triangle with the two forward edges tapered to chisel cutting edges. The straight and rear edge will be fastened to the extension 11. This extension 11 will meet and be fastened to the triangular blade 13, at an obtuse angle so that the blade 13 will be flat and parallel to the ground when in use. The extensions 11 and 12 will be externally threaded to screw into the handle 8 and drilled 15 angularly to lock with a bolt 16 and nut 17.

The cutting blade 14 illustrated in FIGS. 3 and 4 called a lawn edger and substantially takes the form of an ellipse. This blade 14 is tapered to a chisel cutting edge at the front edge and is fastened at an acute angle to an extension 12, at the rear edge. It is fastened at such an acute angle to the extension 12 in order to perform a shearing action upon the ground. The extension 12 is also threaded and adapted to be detachably secured to the same handle 8. This edger is also operated by a push and pull movement.

I claim:

1. A hoeing and lawn edging kit comprising:
   I. a handle, said handle including:
      i. a major portion;
      ii. a grip portion at one end of said major portion, said grip portion being disposed at an obtuse angle to said major portion;
      iii. a terminal portion at the other end of said major portion, said terminal portion being an internally threaded, hollow, cylindrical member; and
      iv. an aperture formed through said terminal portion;
   II. a hoe blade, said hoe blade including:
      a. a main blade portion;
      b. a handle extension portion adapted to be detachably secured to said handle (I),
      wherein:
      i. said main blade portion, in plan view is substantially triangular in shape and having sharpened edges;
      ii. said handle extension includes an externally threaded, terminal, cylindrical portion adapted to mate with the terminal portion (I) (iii) of said handle, said externally threaded portion also being provided with an aperture therethrough adapted to register with the aperture (I) (iv) of the handle; and
      iii. the extension and the hoe blade, in elevation, being disposed at an obtuse angle to one another;
   III. a lawn edger blade including:
      a. a main blade portion; and
      b. an handle extension portion adapted to be detachably secured to said handle (I);
      wherein:
      i. said main blade portion, in elevation is substantially elliptical in shape, and has sharpened edges;
      ii. said handle extension portion includes an externally threaded terminal cylindrical portion adapted to mate with the terminal portion (I) (iii) of said handle, said externally threaded portion also including an aperture therethrough adapted to register with the aperture (I) (iv) of the handle; and
      iii. the extension and the lawn edger blade portion, in elevation, being disposed at an acute angle to one another; and iv. a bolt and nut combination adapted, when said hoe blade (II) or said lawn edger blade (III) is threadably secured to said handle (I) to pass through the registering apertures therein to provide a more positive securement of the selected blade to the handle; whereby a simple push-pull operation on the grip portion of the handle facilitates the hoeing and weeding operation with said hoe blade (II) and the lawn edging operation with said lawn edger blade (III).